United States Patent
Gong (10) Patent No.: US 9,612,688 B2
(45) Date of Patent: Apr. 4, 2017

(54) PROJECTION METHOD AND ELECTRONIC DEVICE

(71) Applicants: Beijing Lenovo Software Ltd., Beijing (CN); Lenovo (Beijing) Co., Ltd., Beijing (CN)

(72) Inventor: Tianyong Gong, Beijing (CN)

(73) Assignees: Beijing Lenovo Software Ltd., Beijing (CN); Lenovo (Beijing) Co., Ltd., Beijing (CN)

(*) Notice: Subject to any disclaimer, the term of this patent is extended or adjusted under 35 U.S.C. 154(b) by 201 days.

(21) Appl. No.: 14/494,923

(22) Filed: Sep. 24, 2014

(65) Prior Publication Data
US 2015/0234541 A1   Aug. 20, 2015

(30) Foreign Application Priority Data
Feb. 19, 2014 (CN) .......................... 2014 1 0056469

(51) Int. Cl.
*G06F 3/14* (2006.01)
*G09G 5/12* (2006.01)
*H04N 5/74* (2006.01)
*G06F 3/042* (2006.01)

(52) U.S. Cl.
CPC .......... *G06F 3/0425* (2013.01); *G06F 3/1423* (2013.01); *H04N 5/74* (2013.01); *G09G 5/12* (2013.01); *G09G 2354/00* (2013.01)

(58) Field of Classification Search
None
See application file for complete search history.

(56) References Cited

U.S. PATENT DOCUMENTS

| 2010/0026624 A1* | 2/2010 | Bell ........................ G06F 3/011 345/156 |
| 2010/0091112 A1* | 4/2010 | Veeser .................. G01B 11/002 348/207.1 |
| 2012/0249741 A1* | 10/2012 | Maciocci ................ G06F 3/011 348/46 |
| 2013/0229325 A1* | 9/2013 | Yu ............................ G09G 5/12 345/2.3 |
| 2013/0229340 A1* | 9/2013 | Yu .......................... G06F 3/1423 345/156 |
| 2013/0328770 A1* | 12/2013 | Parham ................. G06F 3/0304 345/157 |

(Continued)

*Primary Examiner* — Reza Aghevli
(74) *Attorney, Agent, or Firm* — Harness, Dickey & Pierce, P.L.C.

(57) ABSTRACT

The present disclosure discloses an information processing method and an electronic device. The information processing method is applied to the electronic device, which includes an image capture unit and a projection unit. The method includes: obtaining captured data through the image capture unit; determining first positions of M first objects within a predetermined space where the electronic device is located according to the captured data, M≥1; projecting N to-be-projected images to the positions of the N objects, which are corresponding to the N to-be-projected images, within the predetermined space, N≤M. The method or the electronic device in the present disclosure can provide users with intelligentized service by projection function of the electronic device, for example, information prompts.

8 Claims, 7 Drawing Sheets

(56) References Cited

U.S. PATENT DOCUMENTS

2013/0342579 A1* 12/2013 Yu .................... G09G 5/34
345/649
2014/0022283 A1* 1/2014 Chan ................ G02B 27/017
345/633

* cited by examiner

PROJECTION METHOD AND ELECTRONIC DEVICE

The present application claims priority to Chinese patent application No. 201410056469.7 titled "intelligent projection method and electronic device" and filed with the State Intellectual Property Office on Feb. 19, 2014, which is incorporated herein by reference in its entirety.

BACKGROUND

Technical Field

The present disclosure relates to the field of data processing, and particularly to a projection method and an electronic device.

Related Art

Nowadays, all the electronic devices tend to be intelligent. Siri (Apple intelligent voice assistant) system of Apple Inc is a good example of intelligentized electronic device.

However, in the related art, usually the electronic device with projection function is only used to play video program, no intelligentized application is involved.

SUMMARY

The present disclosure provides a projection method and an electronic device, which can provide users with intelligentized service by the projection function of the electronic device.

An information processing method comprises: obtaining image data through an image capture unit; determining first positions of M first objects within a predetermined space where the image capture unit is located based on the image data, M≥1; projecting N to-be-projected images to second positions of N second objects among the original M objects, wherein the N second objects are corresponding to the N to-be-projected images N≤M.

An electronic device includes an image capture unit, a projection unit, an obtaining unit, configured to obtain captured data through the image capture unit; a determining unit, configured to determine first positions of M first objects within a predetermined space where the electronic device is located according to the captured data, M≥1; a projection controlling unit, configured to control the projection unit to project N to-be-projected images to second positions of the N second objects, which are corresponding to the N to-be-projected images, N≤M.

BRIEF DESCRIPTION OF THE DRAWINGS

In order to more clearly illustrate the embodiments in the present disclosure or the technical solution in the prior art, drawings for describing the embodiments will be briefly described hereinafter. Apparently, the drawings in the following description are only several embodiments of the present disclosure, and for those skilled in the art, other drawings may be obtained based on these drawings without any creative work.

DETAILED DESCRIPTION OF EMBODIMENTS

The technical solution of the embodiments provided in the present disclosure is described clearly and completely in conjunction with drawings of the embodiments provided in the present disclosure as follows. Obviously, the drawings in the following description are only several embodiments of the present disclosure, and not all embodiments. Based on these embodiments of the present disclosure, all other embodiments, which can be obtained without any creative work by those skilled in the art, are belong to the protection scope of the present disclosure.

To make the above object, feature and advantage of present disclosure be better understood, the present disclosure is illustrated in detail in conjunction with the drawings and embodiments as follows.

An information processing method in the present disclosure is applied to an electronic device. The electronic device includes an image capture unit, a projection unit and a fixing unit, and the electronic device is fixed on a bearing surface through the fixing unit.

The image capture unit may be a camera for example, which can shoot the external environment, and obtain image collection data of the external environment. The projection unit may be a lens with projection function, for example may be a part of a projector for performing the projection function. The fixing unit may be various kinds of pedestal, which are used to fix the electronic device to a specific position of a room. For example, fixing the electronic device to the ceiling of a room, or fixing the electronic device to the wall of a room. The bearing surface is the plane for fixing the electronic device. The plane of ceiling is the bearing surface while the electronic device is fixed on the ceiling; the plane of wall is the bearing surface while the electronic device is fixed on the wall.

Figure 1:
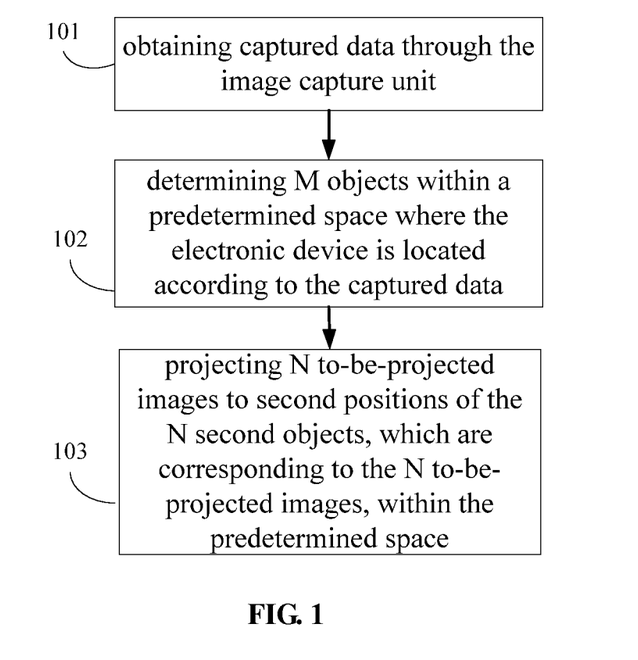
FIG. 1 is a flow diagram of embodiment 1 of an information processing method according to the present disclosure.

FIG. 1 is a flow diagram of embodiment 1 of an information processing method according to the present disclosure. As shown in FIG. 1, the method includes:

Step 101: obtaining captured data through the image capture unit;

collecting the data of environmental information of the electronic device by a camera. The image capture unit can collect image information of current environment.

In practical application, as different cameras have different visual angle ranges, multiple cameras can be used together to collect image information of current environment in different angles, to collect image information of current environment in any angle. For example, four cameras can be used to shoot east, south, west, and north of a room, so as to obtain image information of all the room.

One or multiple cameras, direction of which can be adjusted, also can be used to collect image information of current environment in different angles. For example, one camera can be used to shoot a whole room by adjusting the direction of the camera to east, south, west, and north of a room in sequence, to obtain image information of the whole room.

Step 102: determining original positions of M first objects within a predetermined space where the electronic device is located according to the captured data, M≥1;

determining objects within a predetermined space where the electronic device is located by image recognition for example, according to the captured data. There can be multiple objects.

The position of each object also can be determined after M objects are recognized. The M objects can include any object in a room, for example table, chair, wall, umbrella, door, briefcase, clothes, key. The M objects also can include a movable object, for example can include a person moving in the predetermined space. The moving person can be a user of the electronic device.

Step 103: projecting N to-be-projected images to second positions of the N second objects, which are corresponding to the N to-be-projected images, within the predetermined space, N≤M.

The N objects can be N objects in the M objects. The N to-be-projected images can be images representing the N objects, and also can be images representing of positions of the N objects, or can be images related to the N objects. The positions can be the positions for projecting the N to-be-projected images. Generally, since the objects corresponding to the to-be-projected images which are needed to be projected are only a portion of the M objects within the predetermined space, so N≤M.

Specifically, prompt message of an object to be used by a user can be projected to the position of the object, for example the prompt message of a room key, which will be used by a user when going out, can be projected to the position of the key. The information related to the action, which is to be executed by the user, can be projected to the position of the object related to the action, for example, when the user is to go out, the schedule information for the going out can be projected to the door.

In conclusion, according to the embodiment, M objects within a predetermined space where the electronic device is located can be determined according to the captured data, and N to-be-projected images can be projected to the positions of the N objects, which are corresponding to the N to-be-projected images, within the predetermined space. The present disclosure can provide users with intelligentized service, for example information prompt, by the projection function of the electronic device.

Figure 2:
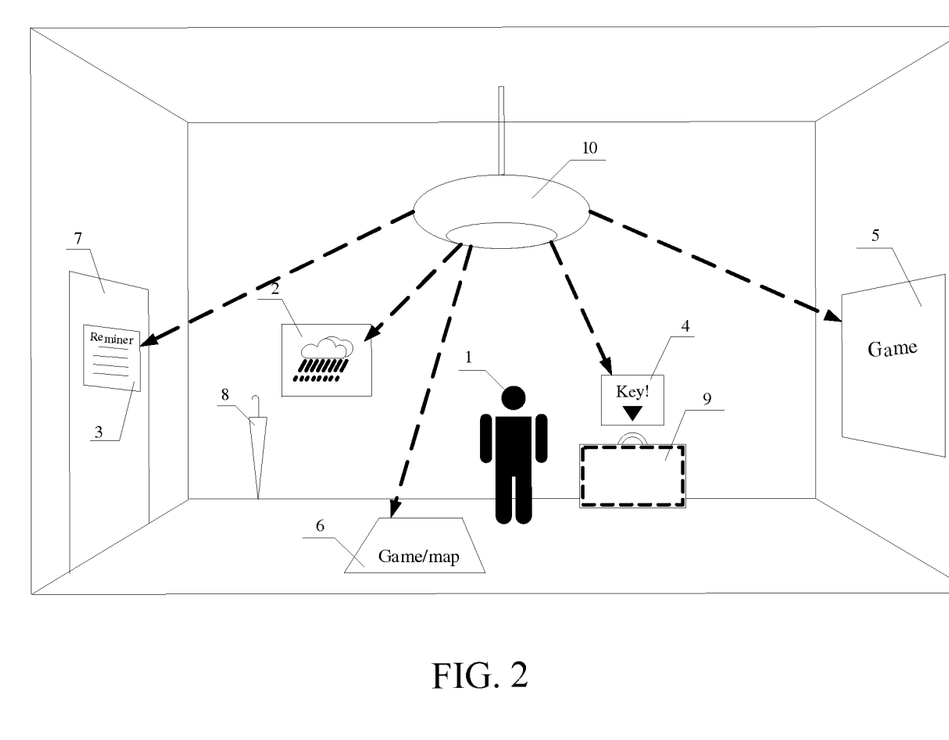
FIG. 2 is a schematic diagram of application scenarios of an information processing method according to the present disclosure.

FIG. 2 is a schematic diagram of application scenarios of an information processing method according to the present disclosure. As shown in FIG. 2, user 1 is in a room. The ceiling of the room is provided with the electronic device 10. The room also includes the following objects: door 7, umbrella 8 and briefcase 9. The electronic device 10 can perceive the moving track of user 1 by the image capture unit, analyze the action to be executed by the user, basing on image recognition for example, and project the to-be-projected images according to the action to be executed by the user.

For example, when the electronic device analyzes that user 1 is to go out, the relevant reminder can be projected to the door 7. The reminder can remind user 1 the schedule for the going out or the relevant information of traffic condition for example.

when the electronic device analyzes that user 1 is going to go out, weather forecast for the same day also can be projected. Projection image 2 indicates that it is raining or is going to rain now. If there is an umbrella within the current predetermined space, weather forecast can be projected near the umbrella. For example, as shown in FIG. 2, the projection image 2 is projected near umbrella 8, so as to remind the user to carry an umbrella when going out. Of course, if the electronic device 10 has holographic projection function, a holographic image of the umbrella can be projected above the head of the user, so as to remind the user to carry an umbrella when going out.

The electronic device also can receive voice command from the user, and determine to-be-projected images and their projection position by semantic analysis. For example, when the user need to find an object within the predetermined space of a room, he can speak the name of the object, then the electronic device 10 can project the image to be projected to the position of the object, to help the user to find the object quickly. For example as shown in FIG. 2, the user can speak "key", then the electronic device 10 can project the projection image 4 above the briefcase 9, to remind the key is in the briefcase 9. Of course, there is a premise for this example which is that by the image capture unit, the electronic device has captured the image information which shows that the key has been putted into the briefcase 9.

In other cases, the projection unit of the electronic device 10 also can project video images to the wall or the floor for example, so that the user can watch video images. Taken FIG. 2 for example, the electronic device 10 can project video image 5 of a game to the wall, and also can project video image 6 of a game or a map to the floor, so that the user can watch video images.

Figure 3:
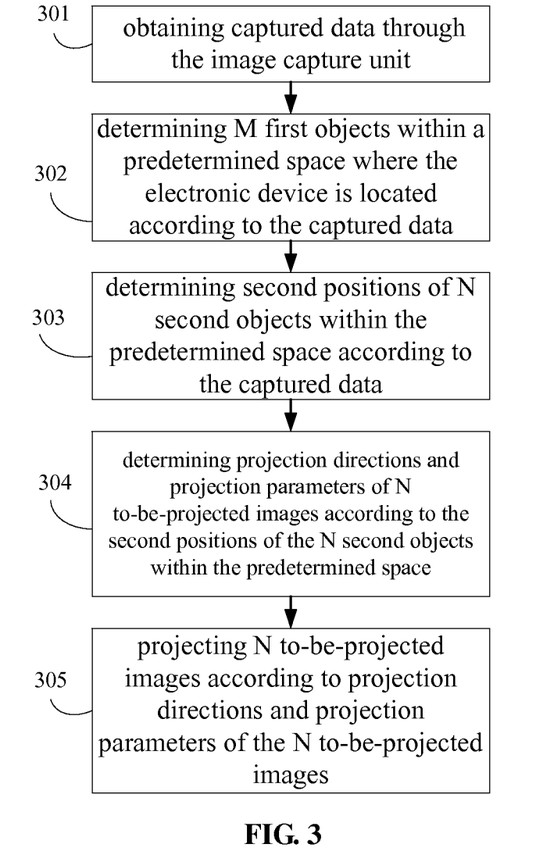
FIG. 3 is a flow diagram of embodiment 2 of an information processing method according to the present disclosure.

FIG. 3 is a flow diagram of embodiment 2 of an information processing method according to the present disclosure. As shown in FIG. 3, the method includes:

Step 301: obtaining captured data through the image capture unit;

Step 302: determining M objects within a predetermined space where the electronic device is located according to the captured data, M≥1;

Step 303: determining the positions of the N objects within the predetermined space through the captured data;

Step 304: determining projection directions and projection parameters of N to-be-projected images according to positions of the N objects within the predetermined space;

Since positions of different objects can be different, the projection position of image to be projected, which is corresponding to a certain object, will change according to the position of the object. In order to ensure that the projected images are regular images, that is, images with no deformation, projection directions and projection parameters of N to-be-projected images are needed to be determined.

Generally, if the projected image is a regular image, the image is usually rectangular. If the projection plane is inclined and the projection parameter remains unchanged, the image will become trapezoidal. In this step, the space angle of the projection plane can be obtained, the projection angle of the image to be projected can be adjusted according to the space angle of the projection plane, such that the projected image is a regular rectangular image.

On the other hand, the distance between the plane to be projected and the projection unit also can influence the focal length of the projection. This step further includes the process of adjusting the focal length of projection according to the distance. Of course, for the specific implementation of adjusting the focal length of projection according to the distance, one can make reference to the prior art, which will be omitted herein.

Step 305: projecting N to-be-projected images according to projection directions and projection parameters of the N to-be-projected images, thereby the N to-be-projected images is presented on the positions of the N objects, which are corresponding to the N to-be-projected images, within the predetermined space.

In this embodiment, by determining projection directions and projection parameters of N to-be-projected images, and projecting N to-be-projected images according to projection directions and each projection parameters of the N to-be-projected images, it can be ensured that the projected images on different projection planes are non-deformable and are regular rectangular images.

Figure 4:
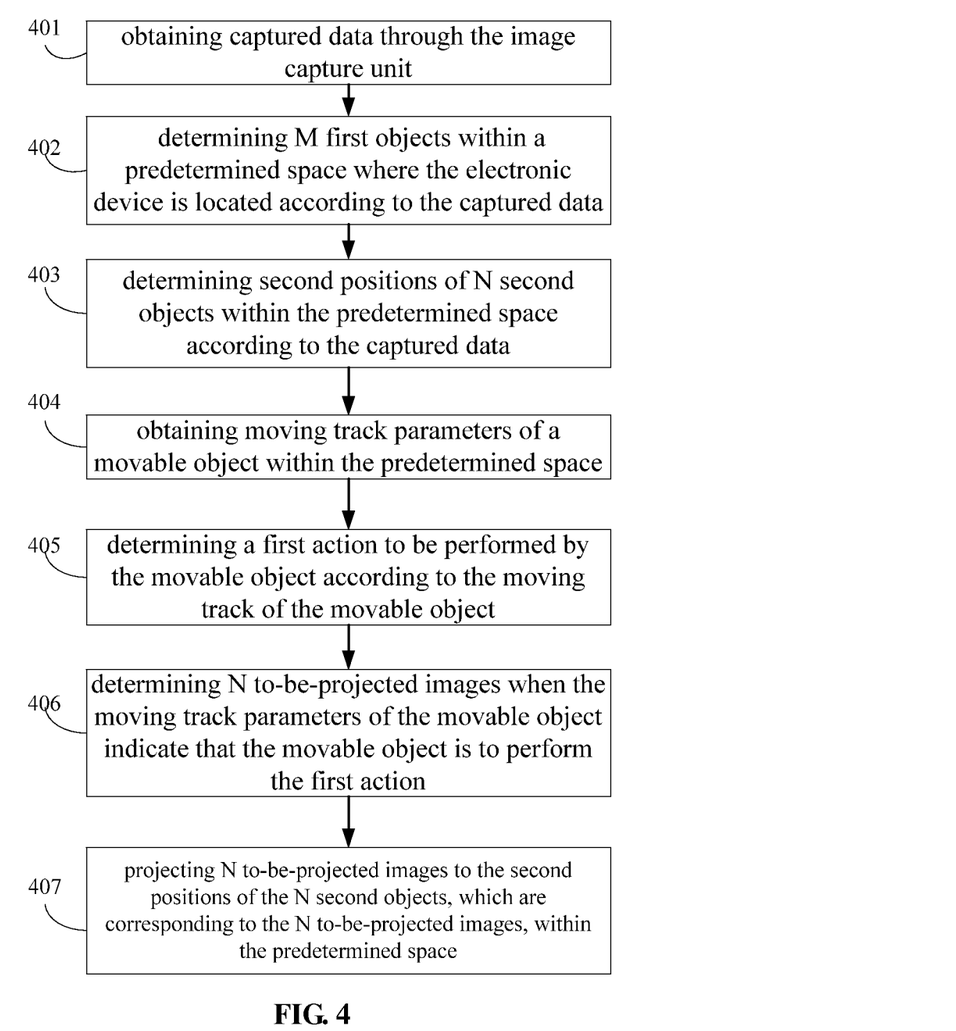
FIG. 4 is a flow diagram of embodiment 3 of an information processing method according to the present disclosure.

FIG. 4 is a flow diagram of embodiment 3 of an information processing method according to the present disclosure. As shown in FIG. 4, the method includes:

Step 401: obtaining captured data through the image capture unit;

Step 402: determining M objects within a predetermined space where the electronic device is located according to the captured data, M≥1;

Step 403: determining the positions of the N objects within the predetermined space according to the captured data;

Step 404: obtaining moving track parameters of a movable object within the predetermined space;

the movable object can be the user in the room. The image capture unit of electronic device can monitor the moving track of the user, and thereby obtaining moving track parameters.

Step 405: determining a first action to be performed by the movable object according to the moving track of the movable object;

the first action, which is to be performed by the user, can be estimated according to the moving track parameters.

For example, when the user moves to the door in FIG. 2, the first action to be performed by the user can be determined to be going out.

For example, when the user moves to the sofa and sit down while facing a TV, the first action to be performed by the user can be determined to be watching TV.

Step 406: determining N to-be-projected images when the moving track parameters of the movable object indicates that the movable object is to perform the first action, the N to-be-projected images are involved in the first action of the movable object;

the first action has not been performed after the first action is determined. N to-be-projected images can be determined when the moving track parameters of the movable object indicate that the movable object is to perform the first action. For example, when the user walks a few steps to the door and has not yet gone out, it means that the user is going to go out. At the moment, N to-be-projected images related to the action of going out can be determined, for example the projection image 2, the projection image 3 and the projection image 4 in FIG. 2.

Step 407: projecting N to-be-projected images to second positions of the N objects, which are corresponding to the N to-be-projected images, within the predetermined space.

In this embodiment, by determining N to-be-projected images when the moving track parameters of the movable object indicates that the movable object is to perform the first action, and projecting N to-be-projected images to second positions of the selected N objects, which are corresponding to the N to-be-projected images, within the predetermined space, one be can reminded the information of the objects related to the first action by projecting images, before the first action is performed.

Figure 5:
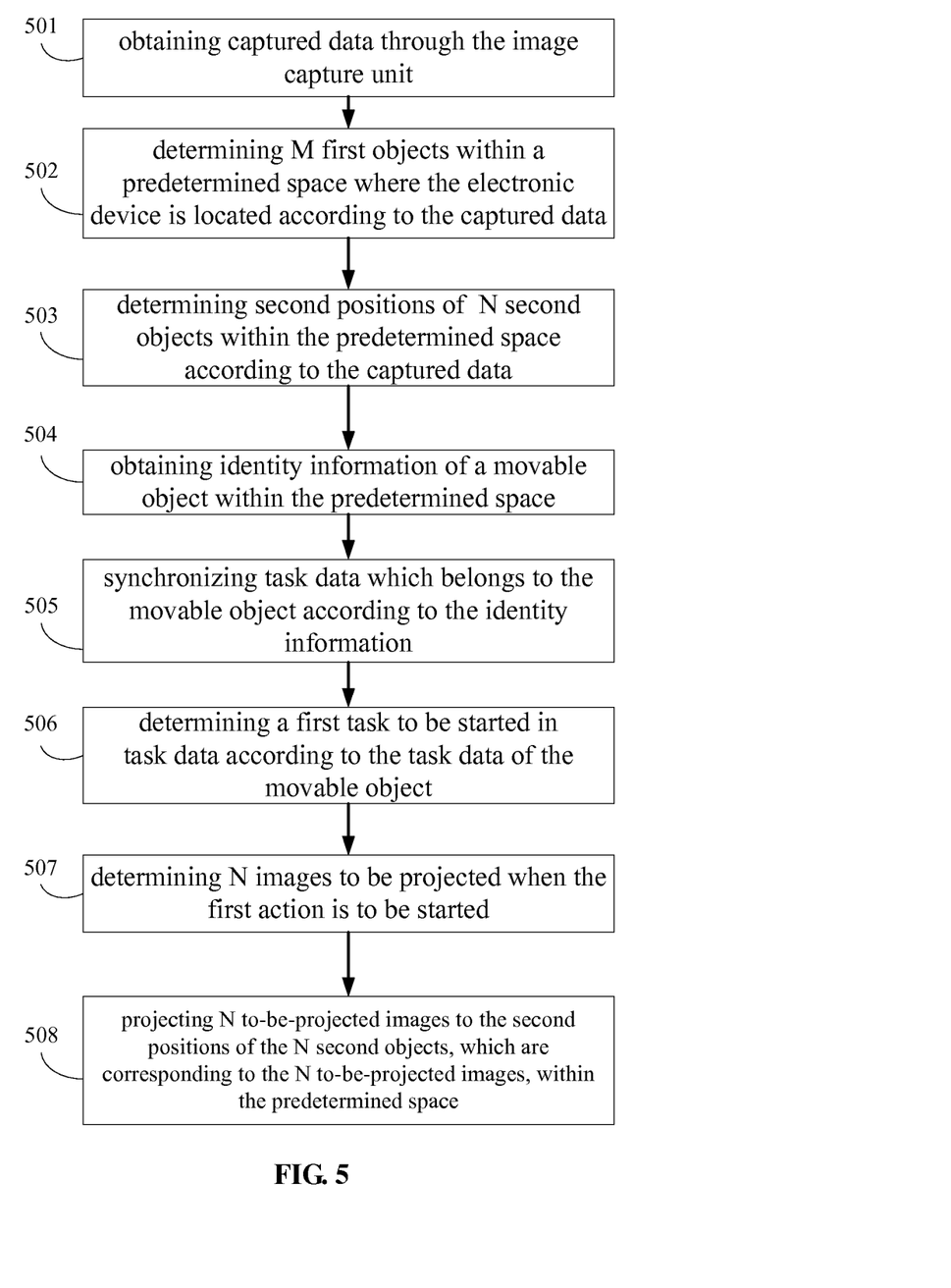
FIG. 5 is a flow diagram of embodiment 4 of an information processing method according to the present disclosure.

FIG. 5 is a flow diagram of embodiment 4 of an information processing method according to the present disclosure. As shown in FIG. 5, the method includes:

Step 501: obtaining captured data through the image capture unit;

Step 502: determining M objects within a predetermined space where the electronic device is located according to the captured data, M≥1;

Step 503: determining the positions of the N objects within the predetermined space through the captured data;

Step 504: obtaining identity information of a movable object within the predetermined space;

the electronic device can obtain task data locally or through a network. Different movable objects may be corresponding to different task data. The task data can include the task information needed to be executed by the movable object within predetermined time. Specifically, the movable object can be a user.

Identity information of the user can be obtained through the image capture unit. For example, collecting facial image of the user, determining identity information of the user by face recognition technology.

Step 505: synchronizing task data belongs to the movable object according to the identity information;

after the identity information of the user is determined, the task data corresponding to the user with the identity information is searched through local database, or through network database by connecting to a network.

For example, when the identity information indicates that the user is Mr. Wang, the corresponding task data may be going out to work at 8:00 am, and going home after work at 6:00 pm for example. When the identity information indicates that the user is Ms. Li, the corresponding task data can be going out to buy vegetables at 9:00 am, and going home to cook at 6:00 pm for example.

Step 506: determining a first task to be started in task data according to the task data of the movable object;

the first task to be started in task data can be determined according to current actual time. For example, if the current time is 7:50 am, for Mr. Wang in previous example, the first task to be started is going out to work; if the current time is 5:39 pm, for Ms. Li in previous example, the first task to be started is going home to cook.

Whether the first task is to be started can be analyzed according to current actual time and action information of the user. For example, if the current time is 7:50 am, Mr. Wang in previous example walks towards the door, then the first task is to be started; if the current time is 7:50 am, Mr. Wang in previous example does not walk towards the door, then the first task is not to be started, temporarily the images related to the first task will not be projected.

Step 507: determining N to-be-projected images when the first task is to be started, the N to-be-projected images are involved in the first task executed by the movable object;

Specifically, if the first task is going out to work, N to-be-projected images which are related to the action of going out can be determined, for example the projection image 2, the projection image 3 and the projection image 4 in FIG. 2.

Step 508: projecting N to-be-projected images to second positions of the selected N objects, which are corresponding to the N to-be-projected images, within the predetermined space.

In this embodiment, for different user, the first task to be started can be determined basing on different task data through identity information of the user, and thereby N to-be-projected images can be determined, N to-be-projected images can be projected to the positions of the N objects, which are corresponding to the N to-be-projected images, within the predetermined space, and the information of objects which involved in the task data corresponding to the user can be reminded by projecting images.

Figure 6:
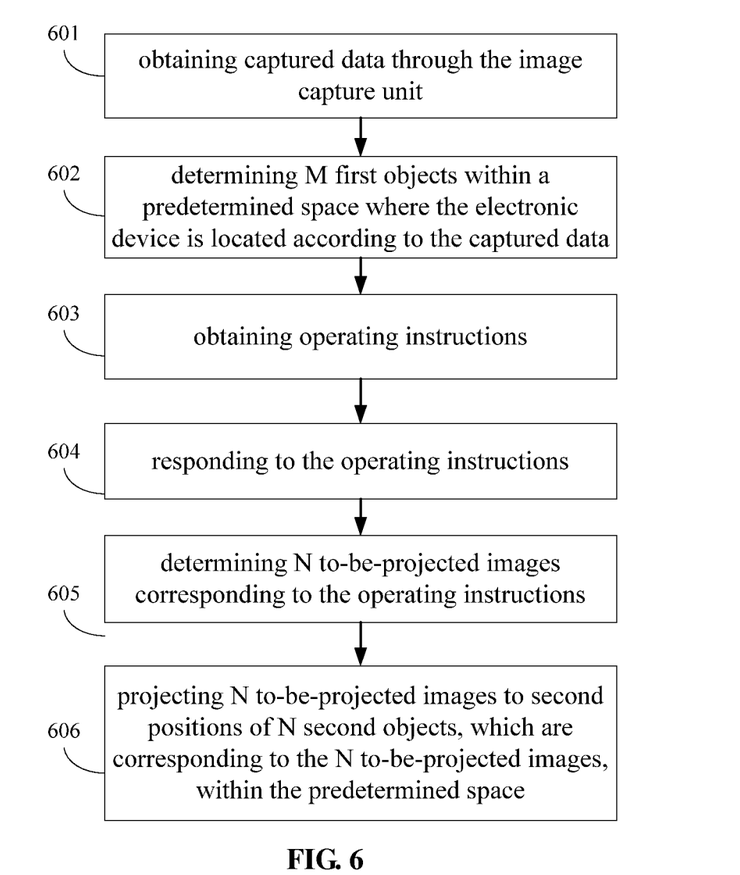
FIG. 6 is a flow diagram of embodiment 5 of an information processing method according to the present disclosure.

FIG. 6 is a flow diagram of embodiment 5 of an information processing method according to the present disclosure. As shown in FIG. 6, the method includes:

Step 601: obtaining captured data through the image capture unit;

Step 602: determining M objects within a predetermined space where the electronic device is located according to the captured data, M≥1;

Step 603: obtaining operating instructions;

the operating instructions can be voice instructions. The voice instructions can be given by the user of the electronic device. For example, the user can indicate that he needs to find an object by speaking the name of the object; the user can indicate that he is going to execute an action by speaking the name of the action.

Step 604: responding to the operating instructions;

when the user speaks the name of the object, the electronic device can obtain captured data by the image capture unit, and analyze the position of the object. For example, the electronic device obtains the information by monitoring that the user puts a mobile phone on a dining-table by a camera at 8:00 am; when the user is to go out at 8:30 am, the user speaks "mobile phone" by the way of voice, the electronic device can project the projection image to the position of the mobile phone on the dining-table through the projection unit.

When the user speaks the name of a certain action, the electronic device can analyze and determine the object involved in the action, then analyze the position of the object based on captured data obtained by the image capture unit. For example, the electronic device obtains the information by monitoring that the user puts a key on a dining-table by a camera at 8:00 am; when the user is going to go out at 8:30 am, the user speaks "going out", the electronic device can project the projection image to the position of the key on the dining-table through the projection unit.

Step 605: determining N to-be-projected images corresponding to the operating instructions;

when multiple objects are involved in the operating instructions, N to-be-projected images corresponding to the operating instructions can be determined.

Step 606: projecting N to-be-projected images to second positions of the selected N objects, which are corresponding to the N to-be-projected images, within the predetermined space.

The N to-be-projected images can be projected simultaneously or in sequence.

Specifically, when the projection unit of the electronic device has multiple projection image output ports, N to-be-projected images can be simultaneously projected to the positions of the N objects, which are corresponding to the N to-be-projected images, within the predetermined space, through multiple projection image output ports.

When the projection unit of the electronic device has one camera, N to-be-projected images can be projected in chronological order to the positions of the N objects, which are corresponding to the N to-be-projected images, within the predetermined space, through controlling the camera.

In this embodiment, projecting N to-be-projected images to second positions of the selected N objects, which are corresponding to the N to-be-projected images, within the predetermined space, is implemented through obtaining operating instructions, responding to operating instructions, and determining N to-be-projected images corresponding to the operating instructions, thereby the user can give instructions to the electronic device by way of voice for example, and according to the operating instructions of the user, the electronic device can remind the information of the object involved in the operating instructions by way of projecting image.

The present disclosure further discloses an electronic device. The electronic device includes an image capture unit, a projection unit and a fixing unit, and is fixed on a bearing surface through the fixing unit.

Figure 7:
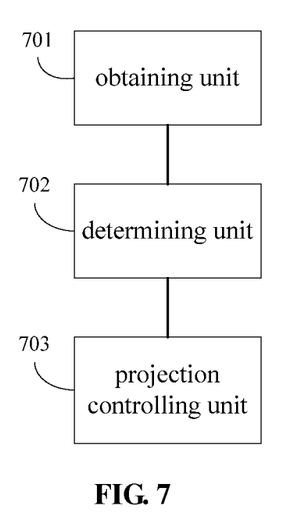
FIG. 7 is a structural view of an embodiment of an electronic device according to the present disclosure.

FIG. 7 is a structural view of an embodiment of an electronic device according to the present disclosure. As shown in FIG. 7, the electronic device includes:

an obtaining unit 701, is configured to obtain captured data through the image capture unit;

a determining unit 702, is configured to determine M objects within a predetermined space where the electronic device is located according to the captured data, M≥1;

a projection controlling unit 703, is configured to control the projection unit to project N to-be-projected images to the positions of the N objects, which are corresponding to the N to-be-projected images, within the predetermined space, N≤M.

In this embodiment, projecting N to-be-projected images to second positions of the selected N objects, which are corresponding to the N to-be-projected images, within the predetermined space, is implemented through determining M objects within a predetermined space where the electronic device is located according to the captured data, and thereby the electronic device can provide the users with intelligentized service by projection function of the electronic device.

In practical application, in order to ensure that the projected image is a regular rectangular image, the projection controlling unit 703 includes:

a first determining subunit, configured to determine the positions of the N objects within the predetermined space according to the captured data;

a second determining subunit, configured to determine projection directions and projection parameters of the N to-be-projected images according to positions of the N objects within the predetermined space;

a first controlling subunit, is configured to control the projection unit to project the N to-be-projected images based on projection directions and projection parameters of the N to-be-projected images, and thereby the N to-be-projected images is presented on the positions of the N objects, which are corresponding to the N to-be-projected images, within the predetermined space.

In practical application, the projection controlling unit 703 further includes:

a parameter information obtaining subunit, configured to obtain parameter information;

a second controlling subunit, configured to control the projection unit to project the N to-be-projected images to the positions of the N objects, which are corresponding to the N to-be-projected images, within the predetermined space, if the parameter information meets predetermined condition.

The parameter information obtaining subunit includes:

a moving track parameters obtaining subunit, configured to obtain moving track parameters of a movable object within the predetermined space;

the second controlling subunit includes:

a first action determining subunit, configured to determine a first action to be performed by the movable object according to the moving track of the movable object;

a first determining subunit for to-be-projected images, configured to determine N to-be-projected images if the moving track parameters of the movable object indicates that the movable object is to perform the first action, the N to-be-projected images are involved in the first action of the movable object;

a third controlling subunit, configured to control the projection unit to project the N to-be-projected images to the positions of the N objects, which are corresponding to the N to-be-projected images, within the predetermined space.

Or, the parameter information obtaining subunit may include:

an identity information obtaining subunit, configured to obtain identity information of a movable object within the predetermined space;

a task data synchronizing subunit, configured to synchronize task data of the movable object based on the identity information;

the second controlling subunit includes:

a first task determining subunit, configured to determine a first task to be started in task data based on task data of the movable object;

a second determining subunit for to-be-projected images, configured to determine N to-be-projected images when the first action is to be started, the N to-be-projected images are involved in the first task executed by the movable object;

a fourth controlling subunit, configured to control the projection unit to project the N to-be-projected images to the positions of the N objects, which are corresponding to the N to-be-projected images, within the predetermined space.

In practical application, the electronic device further includes:

an operating instruction obtaining unit, configured to obtain operating instructions; the projection controlling unit 703 may include:

an operating instruction responding subunit, configured to respond to operating instructions;

a third determining subunit for to-be-projected images, configured to determine N to-be-projected images corresponding to the operating instructions;

a fifth controlling subunit, configured to control the projection unit to project the N to-be-projected images are projected to the positions of the N objects, which are corresponding to the N to-be-projected images, within the predetermined space.

The following technical effect is disclosed, according to embodiments provided in the present disclosure: the information processing method and the electronic device in the present disclosure, determine M first objects within a predetermined space where the electronic device is located according to the captured data, and project N to-be-projected images to the second positions of the N second objects among the M first objects, which are corresponding to the N to-be-projected images, within the predetermined space. Herein, the word first is used to indicate M objects, and the word second is used to indicate N objects selected from M objects. The present disclosure can provide users intelligentized service by the projection of the electronic device, for example, information tips. The method and device in the disclosure are all intelligent.

Eventually, it is important to note, in the present disclosure, relational terms such as a first and a second are only to distinguish an entity or operation with another entity or operation, and do not always require or indicate that there is real relationship or sequence between these entities or operations. The terms "include", "contain" or any other synonyms are intended to cover non-exclusive inclusion, so that the process, method, object or device, which includes a series of factors, not only includes these factors, and further includes other factors which are not explicitly listed, or further includes inherent factors of the process, method, object or device. Without more confine, a factor defined by the sentence "includes a . . . ", does not exclude that the process, method, object or device includes the factor further includes other same factors.

Through the description of embodiments as above, those skilled in the art can clearly learn that the present disclosure can be realized by way of software and necessary hardware platform, and also can be realized all by hardware, however, in many cases, the former is the better way. Basing on the above understanding, all or part of the contribution, which the technical solution in present disclosure makes to the prior art, can be embodied by software product, the software product can be stored in storage medium, such as ROM/RAM, disk, CD, and includes several instructions which can make a computer device (can be a personal computer, a server or a network device, etc) execute the methods described in each or part of embodiments in present disclosure.

In this specification, individual embodiments are described in a progressive manner, the emphasis described for each embodiment is placed on its difference from other embodiments, the same and similar part of each embodiment can be referenced to each other. For the electronic device disclosed in embodiments, the electronic device is corresponding to the methods disclosed in embodiments, so the description is simple, and for related parts, one can see the description of the methods.

In this specification, the specific cases are applied to illustrate the principle and embodiments, the illustration of the embodiments is only to help the understanding of the methods and the core concept of the present disclosure; meanwhile, for those skilled in the art, according to the concept of the present disclosure, the specific embodiment and applied range all can be changed. In conclusion, the content of the specification should not be interpreted as a limit to the present disclosure.

What is claimed is:

1. An information processing method, comprising:
obtaining image data through an image sensor;
determining first positions of M first objects based on the obtained image data within a predetermined space that is within a field-of-view of the image sensor, wherein $M \geq 1$;
obtaining identity information, as parameter information, of a movable object within the predetermined space;
synchronizing task data which belongs to the movable object according to the identity information; and
projecting N images to second positions of N second objects, which correspond to the N images, within the predetermined space, when the parameter information meets predetermined condition, wherein the N second objects are among the M first objects, $N \leq M$, and further wherein the projecting the N images further comprising:
determining a first task to be started in task data according to task data of the movable object; and
determining the N images when a first action is to be performed, wherein the N images are involved in the first task executed by the movable object.

2. The method according to claim 1, wherein the step of projecting the N images to the second positions of the N second objects, which correspond to the N images, comprising:
   determining positions of the N objects within the predetermined space through the obtained image data;
   determining projection directions and projection parameters of N images according to the positions of the N objects within the predetermined space; and
   projecting the N images according to the projection directions and the projection parameters of the N images, thereby the N images is presented on the second positions of the N second objects, which correspond to the N images, within the predetermined space.

3. The method according to claim 1 further comprising:
   obtaining moving track parameters, as the parameter information, of a movable object within the predetermined space;
   the step of projecting the N images to the second positions of the N second objects, which correspond to the N images, within the predetermined space, when the parameter information meets the predetermined condition, comprising:
      determining a first action to be performed by the movable object, according to the moving track of the movable object; and
      determining the N images when the moving track parameters of the movable object indicate that the movable object is to perform the first action, and the N images are involved in the first action of the movable object.

4. The method according to claim 1 further comprising:
   obtaining operating instructions;
   responding to the operating instructions; and
   determining the N images corresponding to the operating instructions.

5. An electronic device comprising:
   an image sensor;
   a projector; and
   a processor configured to:
   obtain captured data through the image sensor;
   determine first positions of M first objects within a predetermined space that is within a field-of-view of the image sensor, according to the captured data, wherein M≥1;
   obtain identity information, as parameter information, of a movable object within the predetermined space;
   synchronize task data which belongs to the movable object according to the identity information;
   control the projector to project the N images to second positions of N second objects, which correspond to the N images, within the predetermined space, when the parameter information meets predetermined condition, wherein the N second objects are among the M first objects, and N≤M, and in controlling the projector, the processor is further configured to:
      determine a first task to be started in task data according to task data of the movable object; and
      determine N images when a first action is to be started, wherein the N images are involved in the first task executed by the movable object.

6. The electronic device according to claim 5, wherein the processor is further configured to:
   determine positions of the N objects within the predetermined space according to the captured data;
   determine projection directions and projection parameters of the N images according to the positions of the N objects within the predetermined space; and
   control the projector to project the N images according to the projection directions and the projection parameter of the N images, thereby the N images is presented on the second positions of the N second objects, which correspond to the N images, within the predetermined space.

7. The electronic device according to claim 5, wherein the processor is further configured to:
   obtain moving track parameters, as the parameter information, of a movable object within the predetermined space;
   determine a first action to be performed by the movable object, according to moving track of the movable object; and
   determine the N images when the moving track parameters of the movable object indicate that the movable object is to perform the first action, the N images are involved in the first action of the movable object.

8. The electronic device according to claim 5, wherein the processor is further configured to:
   obtain operating instructions;
   respond to operating instructions; and
   determine the N images corresponding to the operating instructions.

* * * * *